United States Patent
Döhler

(10) Patent No.: US 12,290,982 B2
(45) Date of Patent: May 6, 2025

(54) METHOD FOR OPERATING AT LEAST ONE APPARATUS FOR ADDITIVELY MANUFACTURING THREE-DIMENSIONAL OBJECTS

(71) Applicant: Concept Laser GmbH, Lichtenfels (DE)

(72) Inventor: Tim Döhler, Grosheirath (DE)

(73) Assignee: Concept Laser GmbH, Lichtenfels (DE)

( * ) Notice: Subject to any disclaimer, the term of this patent is extended or adjusted under 35 U.S.C. 154(b) by 1238 days.

(21) Appl. No.: 17/072,291

(22) Filed: Oct. 16, 2020

(65) Prior Publication Data

US 2021/0039202 A1 Feb. 11, 2021

Related U.S. Application Data

(63) Continuation of application No. 15/939,198, filed on Mar. 28, 2018, now Pat. No. 10,807,195.

(30) Foreign Application Priority Data

Jul. 21, 2017 (EP) ..................................... 17182657

(51) Int. Cl.
*B29C 64/20* (2017.01)
*B22F 10/28* (2021.01)
(Continued)

(52) U.S. Cl.
CPC .............. *B29C 64/20* (2017.08); *B22F 10/28* (2021.01); *B22F 10/70* (2021.01); *B22F 12/70* (2021.01);
(Continued)

(58) Field of Classification Search
CPC .......... B22F 10/28; B22F 10/70; B22F 12/17; B22F 12/70; B23K 26/342; B23K 26/702;
(Continued)

(56) References Cited

U.S. PATENT DOCUMENTS 5,700,989 A 12/1997 Dykhno et al.
5,705,785 A 1/1998 Dykhno et al.
(Continued)

FOREIGN PATENT DOCUMENTS

CN 104145414 A 11/2014
CN 104279678 A 1/2015
(Continued)

OTHER PUBLICATIONS

Combined Chinese Search Report and Office Action Corresponding to CN201710994331 on Apr. 27, 2020.
(Continued)

*Primary Examiner* — Steven W Crabb
*Assistant Examiner* — Ket D Dang
(74) *Attorney, Agent, or Firm* — Wood, Herron & Evans LLP

(57) ABSTRACT

Method for operating at least one apparatus (1) for additively manufacturing three-dimensional objects (2) by means of successive layerwise selective irradiation and consolidation of layers of a powdered build material (3) which can be consolidated by means of an energy beam (4), whereby waste thermal energy (WTE) is generated during operation of the at least one apparatus (1), characterized in that the waste thermal energy (WTE) is at least partly used for generating electrical or mechanical energy (EE, ME) by means of at least one energy converting device (15) and/or the waste thermal energy (WTE) is at least partly used for operating at least one thermal energy consuming device.

16 Claims, 2 Drawing Sheets

Figure 1:
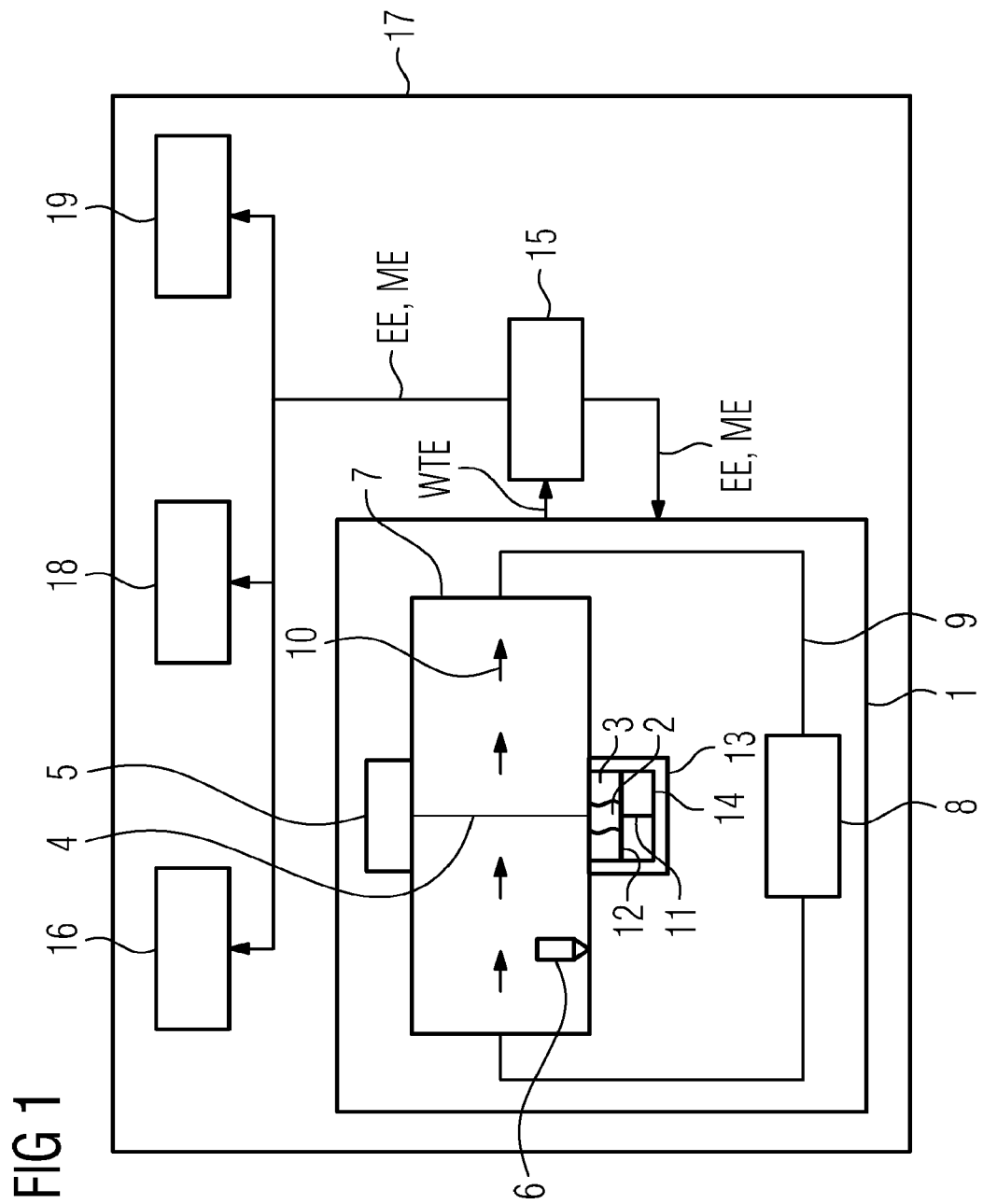

(51) Int. Cl.
    *B22F 10/70*           (2021.01)
    *B22F 12/17*           (2021.01)
    *B22F 12/70*           (2021.01)
    *B23K 26/342*         (2014.01)
    *B23K 26/70*          (2014.01)
    *B29C 64/357*         (2017.01)
    *B33Y 10/00*          (2015.01)
    *B33Y 30/00*          (2015.01)
    *B33Y 40/00*          (2020.01)

(52) U.S. Cl.
    CPC .......... *B23K 26/342* (2015.10); *B23K 26/702* (2015.10); *B29C 64/357* (2017.08); *B33Y 10/00* (2014.12); *B33Y 30/00* (2014.12); *B33Y 40/00* (2014.12); *B22F 12/17* (2021.01)

(58) Field of Classification Search
    CPC ....... B29C 64/20; B29C 64/357; B33Y 10/00; B33Y 30/00; B33Y 40/00; Y02P 10/25
    USPC ....................................................... 219/76.1
    See application file for complete search history.

(56) References Cited

U.S. PATENT DOCUMENTS

| | | | |
|---|---|---|---|
| 6,236,015 | B1 | 5/2001 | Akhavain et al. |
| 6,388,227 | B1 | 5/2002 | Dykhno et al. |
| 7,017,347 | B1 | 3/2006 | Pierce, Jr. |
| 8,414,281 | B2 | 4/2013 | Schleiss et al. |
| 8,497,515 | B1 | 7/2013 | Sagal |
| 9,444,371 | B2 | 9/2016 | Ollier et al. |
| 9,447,705 | B2 * | 9/2016 | Tavares ..................... F23G 5/16 |
| 9,463,080 | B2 * | 10/2016 | Miller ................... F27D 17/004 |
| 2002/0139781 | A1 | 10/2002 | Milewski et al. |
| 2003/0075836 | A1 | 4/2003 | Fong |
| 2011/0083436 | A1 * | 4/2011 | White ....................... F01K 3/08 165/104.19 |
| 2011/0139203 | A1 | 6/2011 | Yap |
| 2011/0214425 | A1 | 9/2011 | Lang et al. |
| 2011/0219771 | A1 | 9/2011 | Stiesdal |
| 2011/0236291 | A1 | 9/2011 | Lang et al. |
| 2013/0047616 | A1 | 2/2013 | Holmes et al. |
| 2013/0178952 | A1 | 7/2013 | Wersborg et al. |
| 2015/0083180 | A1 * | 3/2015 | Lang ..................... H10N 10/13 136/207 |
| 2015/0226188 | A1 | 8/2015 | Miyairi et al. |
| 2016/0093789 | A1 | 3/2016 | Himmer |
| 2016/0207259 | A1 | 7/2016 | Fruth |
| 2016/0207263 | A1 | 7/2016 | Gordon |
| 2016/0284962 | A1 | 9/2016 | Harding |
| 2016/0319690 | A1 | 11/2016 | Lin et al. |
| 2017/0069817 | A1 | 3/2017 | Cauchon et al. |
| 2017/0120332 | A1 * | 5/2017 | DeMuth ................ B29C 64/264 |
| 2017/0144224 | A1 | 5/2017 | DeMuth et al. |
| 2018/0169938 | A1 | 6/2018 | Inenaga et al. |
| 2018/0269371 | A1 | 9/2018 | Franke et al. |
| 2018/0281065 | A1 * | 10/2018 | Perry ..................... B29C 64/35 |
| 2019/0001559 | A1 | 1/2019 | Zamorano et al. |

FOREIGN PATENT DOCUMENTS

| | | |
|---|---|---|
| CN | 204639130 U | 9/2015 |
| CN | 106253749 A | 12/2016 |
| CN | 205905435 U | 1/2017 |
| DE | 102008008621 A1 | 7/2008 |
| DE | 102011108514 A1 | 1/2013 |
| GB | 2521430 A | 6/2015 |
| JP | 2008546536 A | 12/2008 |
| JP | 2016534903 A | 11/2016 |
| KR | 20150129261 A | 11/2015 |
| WO | WO2013081459 A1 | 6/2013 |
| WO | WO2017081812 A1 | 5/2017 |
| WO | WO2017/167356 | 10/2017 |

OTHER PUBLICATIONS

European Office Action Corresponding to EP 17182657.1 on Sep. 10, 2019.

European Search Report Corresponding to U.S. Appl. No. 17/182,657 on Jan. 10, 2018.

* cited by examiner

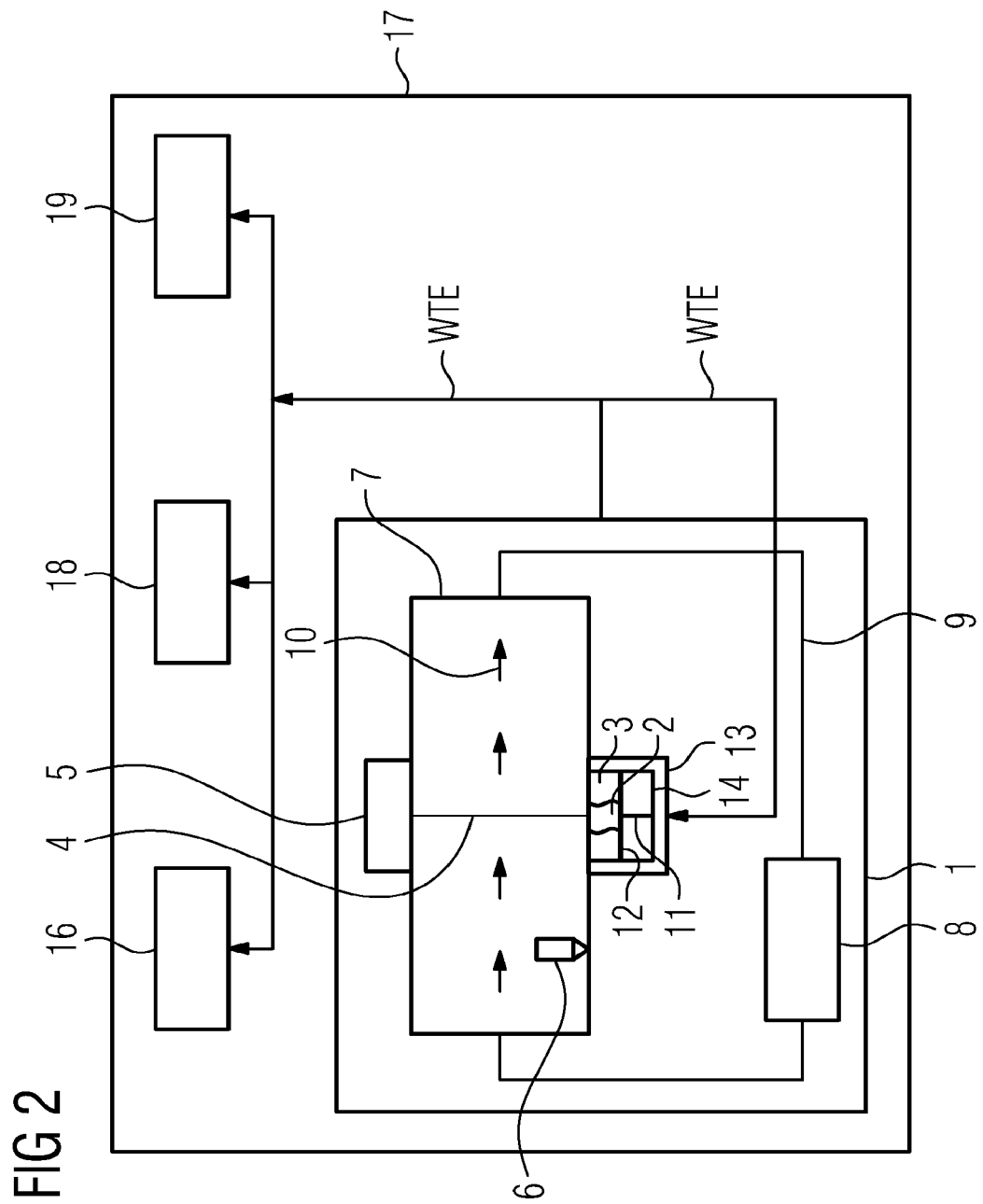

METHOD FOR OPERATING AT LEAST ONE APPARATUS FOR ADDITIVELY MANUFACTURING THREE-DIMENSIONAL OBJECTS

CROSS-REFERENCE TO RELATED APPLICATIONS

This application is a continuation of U.S. patent application Ser. No. 15/939,198 filed Mar. 28, 2018, which claims priority to European Patent Application Serial No. EP17182657.1 filed Jul. 21, 2017. The contents of these applications are incorporated herein by reference in their entirety as if set forth verbatim.

The invention relates to a method for operating at least one apparatus for additively manufacturing three-dimensional objects by means of successive layerwise selective irradiation and consolidation of layers of a powdered build material which can be consolidated by means of an energy beam, whereby waste thermal energy is generated during operation of the at least one apparatus for additively manufacturing three-dimensional objects.

Apparatuses and methods for additively manufacturing three-dimensional objects by means of successive layerwise selective irradiation and accompanying consolidation of layers of a powdered build material which can be consolidated by means of an energy beam, e.g. an electron beam or a laser beam, are widely known. Such apparatuses and methods are implemented in selective laser sintering processes, selective laser melting processes or selective electron beam melting processes, for instance.

It is also known that waste thermal energy is generated during operation of respective apparatuses and the application of respective methods, respectively. Typically, this waste thermal energy is not used so that operation of respective apparatuses and the application of respective methods, respectively generates waste thermal energy which is actually "lost".

In view of the above, it is the object of the invention provide an approach for using the waste thermal energy generated during operation of respective apparatuses for additively manufacturing of three-dimensional objects and the application of respective methods, respectively in efficient manner.

This object is achieved by a method for operating at least one apparatus for additively manufacturing three-dimensional objects according to the claims. The dependent claims relate to possible embodiments of the method.

The method described herein relates to operating at least one apparatus (hereinafter "Apparatus") for additively manufacturing three-dimensional objects, e.g. technical components, by means of successive layerwise selective irradiation and accompanying consolidation of layers of a, typically powdered, build material which can be consolidated by means of an energy beam. A respective build material can be a metal, ceramic or polymer powder. A respective energy beam can be a laser beam or an electronic beam. A respective Apparatus can be a selective laser sintering apparatus, a selective laser melting apparatus or a selective electron beam melting apparatus, for instance.

The Apparatus has a number of functional units which are used during its operation. One exemplary functional unit is an irradiation device which serves for selectively irradiating a build material layer with an energy beam. Further examples of functional units of the Apparatus are mentioned below.

The operation of at least one functional unit of the Apparatus directly or indirectly causes dissipation of waste thermal energy, i.e. waste heat. Hence, waste thermal energy is generated during operation of the Apparatus. The waste thermal energy may be deemed as an energetic side-product of the operation of the Apparatus. As will be explained below in further detail, waste thermal energy can particularly originate from the operation of an irradiation device serving for selectively irradiating build material layers, a heating device serving for heating of a container-like powder module or a heating unit serving for heating of a process chamber of the Apparatus. Referring to the prior art mentioned in the introductory part, the term "waste thermal energy" particularly refers to the thermal energy which is generated during operation of an apparatus for additively manufacturing of three-dimensional objects which is however, not used and therefore actually lost.

According to the method described herein, the waste thermal energy is not lost, but at least partly used.

According to a first option, the waste thermal energy is at least partly converted into electrical and/or mechanical energy. Thus, the waste thermal energy is used for being converted into electrical and/or mechanical energy which can be used by an electrical and/or mechanical energy consuming device. Here, the waste thermal energy generated during operation of a respective Apparatus is transferred to at least one energy converting device where it is converted into electrical and/or mechanical energy which can be used by an electrical and/or mechanical energy consuming device. Of course, the electrical and/or mechanical energy can be at least partly stored temporarily in an appropriate electrical and/or mechanical energy storage means. Also, the electrical and/or mechanical energy can be further converted into other types of energy.

According to an alternative or additional second option, the waste thermal energy is at least partly transferred to at least one thermal energy consuming device. Thus, the waste thermal energy is used by a thermal energy consuming device. Here, the waste thermal energy generated during operation of a respective Apparatus is not converted, but transferred to at least one thermal energy consuming device where it is used. Of course, the thermal energy can be at least partly stored temporarily in an appropriate thermal energy storage means.

In either case, the energy balance of operating a respective Apparatus can be positively influenced significantly by the method described herein. The method provides an approach for using the waste thermal energy generated during operation of a respective Apparatus and the application of respective methods, respectively in efficient manner.

Regarding the first option, the waste thermal energy can at least partly be converted into electrical energy, which electrical energy is transferred/fed to at least one electrical energy consuming device internal of the Apparatus or transferred/fed to at least one electrical energy consuming device external of the Apparatus.

An electrical energy consuming device internal of a respective Apparatus is a device whose function is (directly or indirectly) related to the operation of the Apparatus, i.e. particularly the additive manufacturing process executed by the Apparatus.

An electrical energy consuming device internal of a respective Apparatus can be a functional unit of the Apparatus. According to an example, a respective functional unit can serve for applying a layer of build material, e.g. in a build plane of a process chamber, of the Apparatus. An example of a respective functional unit can be a build material application device, particularly a coating device. According to another example, a functional unit can serve for selectively irradiating a build material layer with at least one energy beam. An example of a respective functional unit can be an irradiation device, particularly an energy beam generating device or an energy beam deflecting device, e.g. a scanning device. According to another example, a functional unit can serve for generating a stream of a process gas along/inside a streaming channel. An example of a respective functional unit can be a streaming device, e.g. a blowing or sucking device. According to another example, a functional unit can serve for generating a driving force for driving at least one driveable functional component. An example of a respective functional unit can be an electric drive, e.g. an electric engine, serving for driving, i.e. particularly moving, a driveable coater of a coating device, a driveable plate supporting build material and/or a three-dimensional object to be additively manufactured, etc. According to another example, a functional unit can serve for heating at least one component of the apparatus. An example of a respective functional unit can be an electrical resistance heating device.

An electrical energy consuming device external of the Apparatus is a device whose function is not (directly or indirectly) related to the operation of the Apparatus. An example of a respective electrical energy consuming device can be an electrical lighting device for lighting of a building, e.g. a hall in which a respective Apparatus is installed, or a part of a building, e.g. a room in which a respective Apparatus is installed. Another example of a respective device can be an electrical heating device for heating of a building, e.g. a hall in which a respective Apparatus is installed, or a part of a building, e.g. a room in which a respective Apparatus is installed.

In either case, an energy converting means configured for directly or indirectly converting waste thermal energy into electrical energy can be used for converting the waste thermal energy into electrical energy. A respective energy converting means can be embodied as an electrical generator or can comprise an electrical generator, for instance.

Still regarding the first option, the waste thermal energy can alternatively or additionally at least partly be converted into mechanical energy, which mechanical energy is transferred/fed to at least one mechanical energy consuming device internal of the Apparatus or transferred/fed to at least one mechanical energy consuming device external of the Apparatus.

A mechanical energy consuming device internal of a respective Apparatus is a device whose function is (directly or indirectly) related to the operation of the apparatus, i.e. particularly the additive manufacturing process executed by the apparatus.

A mechanical energy consuming device internal of a respective Apparatus can be a functional unit of the Apparatus. According to an example, a respective functional unit can serve for applying a layer of build material, e.g. in a build plane of a process chamber of the apparatus. An example of a respective functional unit can be a build material application device, particularly a coating device. According to another example, a respective functional unit can serve for selectively irradiating a build material layer with an energy beam. An example of a respective functional unit can be an irradiation device, particularly an energy beam deflecting device, e.g. a scanning device. According to another example, a respective functional unit can serve for generating a stream of a process gas along/inside a streaming channel. An example of a respective functional unit can be a streaming device, e.g. a blowing or sucking device. According to another example, a respective functional unit can serve for generating a driving force for driving at least one driveable functional component. An example of a respective functional unit can be an electric drive, e.g. an electric engine, serving for driving, i.e. particularly moving, a driveable coater of a coating device, a driveable plate supporting build material and/or three-dimensional object to be additively manufactured, etc.

A mechanical energy consuming device external of a respective Apparatus is a device whose function is not (directly or indirectly) related to the operation of the apparatus. An example of a respective mechanical energy consuming device can be a conveying or transportation device for conveying or transportation of items, e.g. within a building in which a respective Apparatus is installed, or a part of a building, e.g. a room in which a respective Apparatus is installed.

In either case, an energy converting means configured for directly or indirectly converting thermal energy into mechanical energy can be used for converting the waste thermal energy into mechanical energy. A respective energy converting means can be embodied as a heat engine or can comprise a heat engine, for instance.

Regarding the second option, the waste thermal energy can at least partly be used for operating at least one thermal energy consuming device, whereby the waste thermal energy is transferred/fed to at least one thermal energy consuming device internal of the apparatus or at least one thermal energy consuming device external of the apparatus.

A thermal energy consuming device internal of a respective Apparatus is a device whose function is (directly or indirectly) related to the operation of a respective Apparatus, i.e. particularly the additive manufacturing process executed by the Apparatus.

Thus, the waste thermal energy can be at least partly be transferred to at least one thermal energy consuming device internal of a respective Apparatus. A thermal energy consuming device internal of a respective Apparatus can be a functional unit of the Apparatus. According to an example, a respective functional unit can serve for heating of at least one functional component, e.g. a container-like powder module of the Apparatus, which comprises a powder chamber for receiving powder-like build material, or a process chamber, of the Apparatus. An example of a respective functional unit can be a heating device, particularly a heating device using a heating fluid, e.g. a gas or a liquid, streaming through a heating channel structure.

Independent of its concrete use, the waste thermal energy can be taken from different functional units of a respective Apparatus which (directly or indirectly) generate waste thermal energy. As an example, waste thermal energy can be taken from an energy beam, i.e. particularly a laser beam, used for selectively irradiating build material layers during operation of the Apparatus. As a further example, waste thermal energy can be taken from at least partly reflected energy irradiation generated during operation of the Apparatus. As a further example, waste thermal energy can be taken from wall portions of the Apparatus heated during operation of the Apparatus, e.g. heated walls of container-like powder modules or heated walls of a process chamber, heated streaming channel walls defining an inner streaming volume through which a process gas may stream during operation of the Apparatus. In this regard, heat exchangers or any other thermally conductive structures, can be used for taking the waste thermal energy from the respective functional units of the Apparatus.

A thermal energy consuming device external of a respective Apparatus is a device whose function is not (directly or indirectly) related to the operation of the Apparatus. An example of a respective device is a heating device for heating at least part of a building, e.g. a hall in which the Apparatus is installed, or a part of a building, e.g. a room, in which the Apparatus is installed.

The invention also relates to an apparatus for additively manufacturing of three-dimensional objects by means of successive layerwise selective irradiation and consolidation of layers of a build material which can be consolidated by means of an energy beam. The apparatus, which may be a selective laser sintering apparatus, a selective laser melting apparatus or a selective electron beam apparatus, for instance and which is typically, installed in a building or a part of a building, is configured for performing the method as described above. At least one energy converting means may be associated to the apparatus. All annotations concerning the method apply to the apparatus in analogous manner.

The invention further relates to a plant for additively manufacturing of three-dimensional objects, comprising a plurality of apparatuses for additively manufacturing of three-dimensional objects by means of successive layerwise selective irradiation and consolidation of layers of a build material which can be consolidated by means of an energy beam. The plant, which is typically, installed in at least one building or at least one part of a building, is configured for performing the method as described above. At least one energy converting means may be associated to the plant. All annotations concerning the method also apply to the plant in analogous manner.

Exemplary embodiments of the invention are described with reference to the FIG., whereby FIGS. 1, 2 each show a principal drawing of an apparatus for additively manufacturing three-dimensional objects.

The FIG. each show a principal drawing of an apparatus 1 for additively manufacturing three-dimensional objects 2, e.g. technical components, by means of successive layerwise selective irradiation and accompanying consolidation of layers of a powdered build material 3, e.g. a metal powder, which can be consolidated by means of an energy beam 4, e.g. a laser beam. The apparatus 1 can be a selective laser melting apparatus, for instance. The apparatus 1 can be part of a plant comprising a plurality of respective apparatuses 1 for additively manufacturing three-dimensional objects 2.

The apparatus 1 has a number of functional units which are used during its operation. An exemplary functional unit is an irradiation device 5, particularly an energy beam generating device and/or an energy beam deflecting device, e.g. a scanning device, which serves for selectively irradiating a build material layer with an energy beam 4. Another exemplary functional unit is a build material application device 6, particularly a coating device, serving for applying a layer of build material 3, e.g. in a build plane of a process chamber 7, of the apparatus 1. Another exemplary functional unit is a streaming device 8 serving for generating a stream of a process gas 10 along a streaming path/channel 9, e.g. a blowing or sucking device. Another exemplary functional unit is an drive device 11, e.g. an electric engine, serving for generating a driving force for driving at least one driveable functional component, e.g. a driveable coater of a coating device, a driveable plate 12 supporting build material 3 and/or a three-dimensional object 2 to be additively manufactured. Another exemplary functional unit is an electrical resistance heating device 13 serving for heating at least one functional component, e.g. a powder module 14, the process chamber 7, etc.

The operation of at least one functional unit of the apparatus 1 directly or indirectly causes dissipation of waste thermal energy WTE, i.e. waste heat. Hence, waste thermal energy WTE is generated during operation of the apparatus 1. The waste thermal energy WTE is to be deemed as an energetic side-product of the operation of the apparatus 1.

The apparatus 1 is implemented for performing a method allowing that the waste thermal energy WTE is not lost, but used.

According to a first embodiment of the method, see FIG. 1, the waste thermal energy WTE is at least partly converted into electrical energy EE and/or mechanical energy ME. Thus, the waste thermal energy WTE is used for being converted into electrical energy EE and/or mechanical energy ME which can be used by an electrical and/or mechanical energy consuming device. Here, the waste thermal energy WTE generated during operation of the apparatus 1 is transferred to at least one energy converting device 15 where it is converted into electrical energy EE and/or mechanical energy ME which can be used by an electrical and/or mechanical energy consuming device. Of course, the electrical energy EE and/or the mechanical energy ME can be at least partly stored temporarily in an appropriate electrical and/or mechanical energy storage means (not shown). Also, the electrical energy EE and/or the mechanical energy ME can be further converted into other types of energy.

The electrical energy EE converted from the waste thermal energy WTE can at least partly be transferred to at least one electrical energy consuming device internal of the apparatus 1 or to at least one electrical energy consuming device external of the apparatus 1.

An electrical energy consuming device internal of the apparatus 1 can be one of the functional units of the apparatus 1, e.g. the irradiation device 5, the build material application device 6, the streaming device 8, the drive device 11, the heating device 13.

An example of an electrical energy consuming device external of the apparatus 1 can be an electrical lighting device 16 for lighting of a building 17, e.g. a hall in which the apparatus 1 is installed, or a part of the building 17, e.g. a room in which the apparatus 1 is installed.

Another example of an electrical energy consuming device external of the apparatus 1 can be a heating device 18 for electrically heating of the building 17 or a part of the building 17, e.g. a room in which the apparatus 1 is installed.

The energy converting device 15 configured for directly or indirectly converting waste thermal energy WTE into electrical energy EE can be embodied as an electrical generator or can comprise an electrical generator.

The mechanical energy ME converted from the waste thermal energy WTE can at least partly be transferred to at least one mechanical energy consuming device internal of the apparatus 1 or to at least one mechanical energy consuming device external of the apparatus 1.

A mechanical energy consuming device internal of the apparatus 1 can be one of the functional units of the apparatus 1, e.g., the build material application device 6, the streaming device 8, the drive device 11.

An example of a mechanical energy consuming device external of the apparatus 1 can be a conveying or transportation device 19 for conveying or transportation of items, e.g. within a building 17 in which the apparatus 1 is installed, or a part of the building 17, e.g. a room in which the apparatus 1 is installed.

The energy converting device 15 configured for directly or indirectly converting waste thermal energy WTE into mechanical energy ME can be embodied as a heat engine or can comprise a heat engine.

According to an alternative or additional second embodiment of the method, see FIG. 2, the waste thermal energy WTE is at least partly transferred to at least one thermal energy consuming device. Thus, the waste thermal energy WTE is used by a thermal energy consuming device. Here, the waste thermal energy WTE generated during operation of the apparatus 1 is not converted, but transferred to at least one thermal energy consuming device where it is used. Of course, the thermal energy WTE can be at least partly stored temporarily in an appropriate thermal energy storage means (not shown).

The waste thermal energy WTE can at least partly be used for operating at least one thermal energy consuming device, whereby the waste thermal energy WTE is transferred to at least one thermal energy consuming device internal of the apparatus 1 or at least one thermal energy consuming device external of the apparatus 1.

An example of a thermal energy consuming device internal of the apparatus 1 can be the heating device 13.

An example of a thermal energy consuming device external of the apparatus 1 can be a heating device for electrically heating of the building 17 or a part of the building 17, e.g. a room in which the apparatus 1 is installed.

Independent of its concrete use, the waste thermal energy WTE can be taken from different functional units of the apparatus 1 which (directly or indirectly) generate waste thermal energy WTE. As an example, waste thermal energy WTE can be taken from the energy beam 4 used for selectively irradiating build material layers during operation of the apparatus 1. As a further example, waste thermal energy WTE can be taken from at least partly reflected energy irradiation generated during operation of the apparatus 1. As a further example, waste thermal energy WTE can be taken from wall portions of the apparatus 1 heated during operation of the apparatus 1, e.g. heated walls of powder modules 14 or heated walls of the process chamber 7, heated streaming channel walls defining an inner streaming volume through which a process gas 10 may stream during operation of the apparatus 1. In this regard, heat exchangers or any other thermally conductive structures, can be used for taking the waste thermal energy WTE from the respective functional units of the apparatus 1.

The invention claimed is:

1. An apparatus for additively manufacturing three-dimensional objects, the apparatus comprising:
   an irradiation device configured to selectively irradiate successive layers of a build material via an energy beam within a build chamber, wherein waste thermal energy is produced during selective irradiation of the build material from at least one of irradiation reflected from the build material or a wall portion of the apparatus having been heated during operation of the apparatus, wherein the wall portion of the apparatus comprises a heated streaming channel wall defining an inner streaming volume configured to receive a stream of process gas from the build chamber during operation of the apparatus; and
   an energy converting device configured to convert at least a portion of the waste thermal energy into energy for storage and/or subsequent consumption by one or more energy consuming devices.

2. The apparatus of claim 1, wherein the energy converting device converts at least the portion of the waste thermal energy into electrical energy.

3. The apparatus of claim 1, wherein the energy converting device converts at least the portion of the waste thermal energy into mechanical energy.

4. The apparatus of claim 1 further comprising a streaming device that generates the stream of the process gas within the build chamber.

5. The apparatus of claim 1, wherein at least one of the one or more energy consuming devices comprises a build material application device that applies one or more of the successive layers of the build material in a build plane within the build chamber.

6. The apparatus of claim 1, wherein at least one of the one or more energy consuming devices comprises a drive device for generating a driving force for at least one driveable functional component of the apparatus.

7. The apparatus of claim 1, wherein at least one of the one or more energy consuming devices comprises a heating device.

8. The apparatus of claim 7, wherein the heating device is external the apparatus.

9. The apparatus of claim 1, wherein at least one of the one or more electrical energy consuming devices is internal the apparatus.

10. The apparatus of claim 1, wherein at least one of the one or more electrical energy consuming devices is external the apparatus.

11. The apparatus of claim 10, wherein at least one of the one or more electrical energy consuming devices comprises a conveyor or transportation device.

12. The apparatus of claim 10, wherein at least one of the one or more electrical energy consuming devices comprises an electrical heating device configured to heat at least a portion of a building.

13. The apparatus of claim 10, wherein at least one of the one or more electrical energy consuming devices comprises an electrical lighting device configured to light at least a portion of a building.

14. The apparatus of claim 1, wherein at least one of the one or more energy consuming devices comprises the apparatus.

15. The apparatus of claim 1, wherein the energy converting device comprises an electrical generator, a transportation device, or a heat engine.

16. The apparatus of claim 1, wherein the energy converting device transfers at least some of the waste thermal energy to the energy converting device using a thermal energy carrier medium.

* * * * *